(12) United States Patent
Jones et al.

(10) Patent No.: US 6,321,032 B1
(45) Date of Patent: Nov. 20, 2001

(54) BRUSHLESS REPULSION MOTOR

(75) Inventors: William M. Jones, Hunting Valley; Lambert Haner, Rocky River, both of OH (US)

(73) Assignee: Dynamotors, Inc., Cleveland, OH (US)

( * ) Notice: Subject to any disclaimer, the term of this patent is extended or adjusted under 35 U.S.C. 154(b) by 0 days.

(21) Appl. No.: 09/566,887

(22) Filed: May 8, 2000

Related U.S. Application Data

(63) Continuation-in-part of application No. 09/248,498, filed on Feb. 10, 1999, which is a continuation-in-part of application No. 08/919,537, filed on Aug. 28, 1997, now Pat. No. 5,936,374, which is a continuation of application No. 08/535,339, filed on Sep. 28, 1995, now Pat. No. 5,686,805, which is a continuation of application No. 08/305,575, filed on Sep. 14, 1994, now Pat. No. 5,491,398, which is a continuation of application No. 08/037,246, filed on Mar. 26, 1993, now Pat. No. 5,424,625.

(51) Int. Cl.[7] ........................................................ H02P 5/17
(52) U.S. Cl. ........................ 388/811; 318/254; 318/138; 318/439; 318/724
(58) Field of Search ..................................... 388/811, 725, 388/724, 254, 138, 439; 310/164

(56) References Cited

U.S. PATENT DOCUMENTS

| | | | | |
|---|---|---|---|---|
| 4,761,602 | * | 8/1988 | Leibovich | 318/816 |
| 5,424,625 | | 6/1995 | Haner . | |
| 5,677,586 | * | 10/1997 | Horst | 310/103 |
| 5,798,591 | * | 8/1998 | Lillington et al. | 310/164 |
| 6,108,488 | | 8/2000 | Haner . | |

* cited by examiner

Primary Examiner—Karen Masih
(74) Attorney, Agent, or Firm—Vickers, Daniels & Young

(57) ABSTRACT

A brushless repulsion motor which includes a stator and rotor rotatably mounted on the stator is provided. The stator and rotor are contained within a first housing, the stator having at least one pair of poles, a field winding on the stator for producing a field on the stator, and a plurality of coils on the rotor adapted to electromagnetically interact with the field of the stator winding. Switches are located on the rotor shaft outside the first housing to selectively short successive ones of the coils when the coils are in a preferred angular position relative to the stator poles. Thus, the stator field is effective to induce a current in the rotor and produce a resultant relative rotation between the rotor and the stator which can be controlled by non-contact signaling means which activate the switches.

21 Claims, 6 Drawing Sheets

BRUSHLESS REPULSION MOTOR

This application is a continuation-in-part of application Ser. No. 09/248,498, filed Feb. 10, 1999, which in turn is a continuation-in-part of application Ser. No. 08/919,537, filed Aug. 28, 1997, now U.S. Pat. No. 5,936,374, which is in turn a continuation of application Ser. No. 08/535,339, filed Sep. 28, 1995, now U.S. Pat. No. 5,686,805, which is a continuation of application Ser. No. 08/305,575, filed Sep. 14, 1994, now U.S. Pat. No. 5,491,398, which is a continuation of application Ser. No. 08/037,246, filed Mar. 26, 1993, now U.S. Pat. No. 5,424,625.

INCORPORATION BY REFERENCE

U.S. Pat. No. 5,424,625 and application Ser. No. 09/248,498, filed Feb. 10, 1999, are both incorporated by reference herein, so that background information and structure of brushless as repulsion motors need not be described in detail herein.

BACKGROUND OF THE INVENTION

The invention relates to improvements in electric motors and in particular, to an improved brushless repulsion type motor. Conventional repulsion motors are typically constructed with a single phase stator and a DC rotor having an armature winding connected to a commutator.

Diametrically opposed carbon brushes riding on the commutator are shorted together, but are not directly connected to the AC power line. When AC power is applied to the stator winding, currents are induced in the armature to create the rotor field. Important advantages possessed by the repulsion motor are the relatively high value of the starting torque with comparatively low starting current, the ability to sustain high starting torques for long periods of time, such as may exist under conditions of high inertial load, and an adaptability to wide range speed control.

The speed torque curve of a repulsion motor is similar to that of universal series motors or series type DC motors. The no-load speed of the repulsion motor can be many times higher than the synchronous speed. A problem with the conventional repulsion motor is that the brushes and commutator wear out quickly due to arcing and heat generated by the brushes in contact with the commutator. As a result, basic repulsion motors are not commonly used today because of the brush wear problem.

Other motor types have been designed to minimize these problems. For example, a repulsion start, induction run motor is designed with a squirrel cage rotor embedded in the wound armature. Mechanical means are used to lift the brushes from the commutator when the rotor speed reaches a predetermined value, and the motor then runs as an induction motor. This is done to develop a very high starting torque for the induction motor.

Another motor is disclosed in U.S. Pat. No. 5,424,625, incorporated by reference herein. In accordance with that disclosure, electronic switching means is carried on the rotating armature to short individual coils at appropriate times in a cycle of rotation to eliminate the need for brush and commutator elements. Specifically, an electronic switch circuit is provided for replacing the switch and current carrying function of one pair of oppositely disposed commutator segments or bars. Electrical power needed to energize the electronic switching means and any related control circuitry on the armature is produced on the armature by induction from the stator field. The control electronics on the armature include circuitry to sense an enabling signal from stationary signaling means mounted on the stator in order to control the actuation of the electronic switches. Control circuitry is operative when a coil is at a predetermined angular position, relative to the stator. Each switch shorts the ends of an associated coil together. The result of this short is essentially the same as that achieved in the prior art by a pair of opposed shorted brushes.

However, the armature and induction field within such motor housing produce heat which is not easily dissipated and the temperature in the motor rises. Such elevated temperature reduces the power capability, reliability, and life of electronic switches and other components. It is also very difficult to replace or repair the electronic components within the motor housing. This involves complete disassembly of the motor, which is both time consuming and expensive.

SUMMARY OF THE INVENTION

The present invention advantageously provides an improved brushless repulsion motor which provides construction alternatives to the prior art of brushless repulsion motors. In this respect, applicant has placed the electronic switching and control circuitry outside of the motor housing, while maintaining the advantageous utilization of the electronic switches to short individual coils at appropriate times in the cycle of rotation. Therefore, the heat generated by the motor has a much reduced effect on the temperature environment of the electronic parts. In addition, with the placement of the electronic parts exterior to the motor housing, it is much easier to provide maintenance service when required.

More particularly in this respect, a repulsion motor is provided comprising a stator and a rotor rotatably mounted on the stator for rotation about an axis. The stator and rotor are contained within a motor housing, the stator having at least one pair of poles, a field winding on the stator for producing a field in the stator, and a plurality of coils on the rotor adapted to electromagnetically interact with the field of the stator winding. In a preferred embodiment, electronic switches are located on an extension of the rotor shaft outside the motor housing and, preferably within a separate housing or enclosure, to selectively short successive ones of the rotor coils when the coils are in a desired angular position relative to the stator poles. Thus, the alternating stator field induces a current in the coils and produces a resultant relative rotation between the rotor and stator.

In the preferred embodiment, the signaling means and the controls for operating them are also located outside the motor housing and within the second housing. Each of the electronic switches and control circuitry is wired to a signal receiving means located on the armature outside the motor housing. The signal is then transmitted to the control circuitry, which in turn sends a signal to the electronic switches to short the ends of an associated coil together.

The present invention improves brushless repulsion motors significantly. Due to the location of the switches outside the motor housing, the switches are not subject to the same heat to which they are subject inside the motor housing. Placing the electronics outside the motor housing and connecting them to rotor coils inside the motor housing also adds the distinct advantage of easily allowing replacement or repair of the electronic switches and other components as necessary. There is no need to work inside confined, frequently hot spaces of the motor or the necessity to remove the bearing and end bell of the motor to obtain access to the electronic switches. In a preferred embodiment, the entire electronic switch assembly can be connected to the rotor windings by a quick connect plug or other means to allow easy separation for repair or replacement. Finally, heat sinks for the electronic switches are more effective in the cooler environment outside the motor housing.

It is thus an outstanding object of the present invention to provide an improved brushless repulsion motor using electronic switching to short individual coils of a repulsion motor.

It is yet another object of the present invention to provide an improved brushless repulsion motor in which electronic switches are easier to replace if damaged than heretofore known.

Still another object of the present invention is to provide an improved brushless repulsion motor in which the heat generated within the motor housing is diminished as a factor in designing the electronic switching.

Yet still another object of the present invention is to provide an improved brushless repulsion motor which is easy to repair and maintain.

Still another object of the present invention is to provide an improved brushless repulsion motor in which power transistor switches act as vanes of a fan blade for additional cooling of the motor.

These and other objects of the invention will become apparent to those skilled in the art upon reading and understanding the following detailed description of the preferred embodiment.

BRIEF DESCRIPTION OF THE DRAWINGS

The invention may take physical form and certain parts and arrangement of parts, the preferred embodiment of which will be described in detail and illustrated in the accompanying drawings to form a part hereof and wherein.

DETAILED DESCRIPTION OF THE INVENTION

Figure 1:
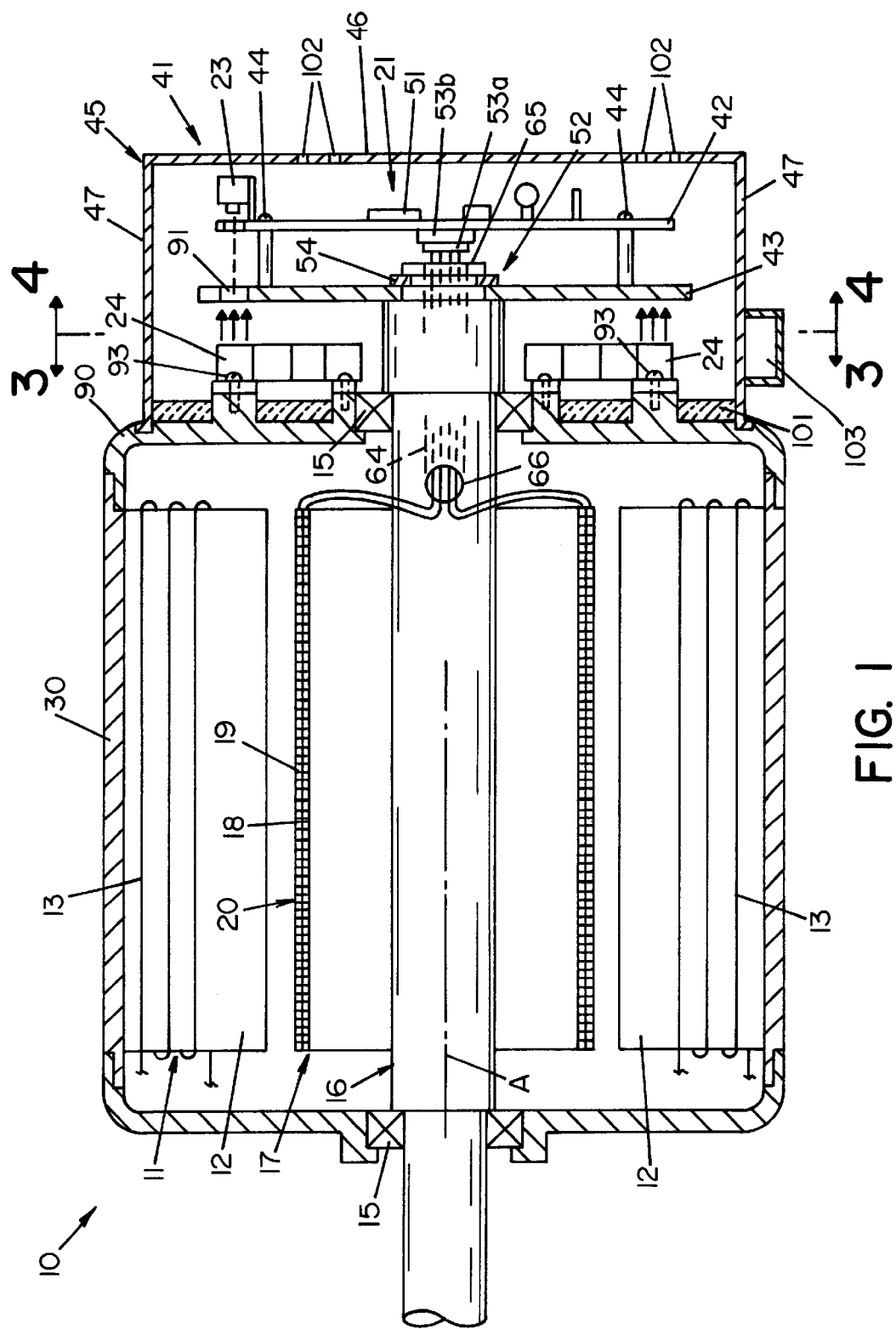
FIG. 1 is a plan view of a brushless repulsion motor, partially in cross-section, of the present invention.
Figure 2:
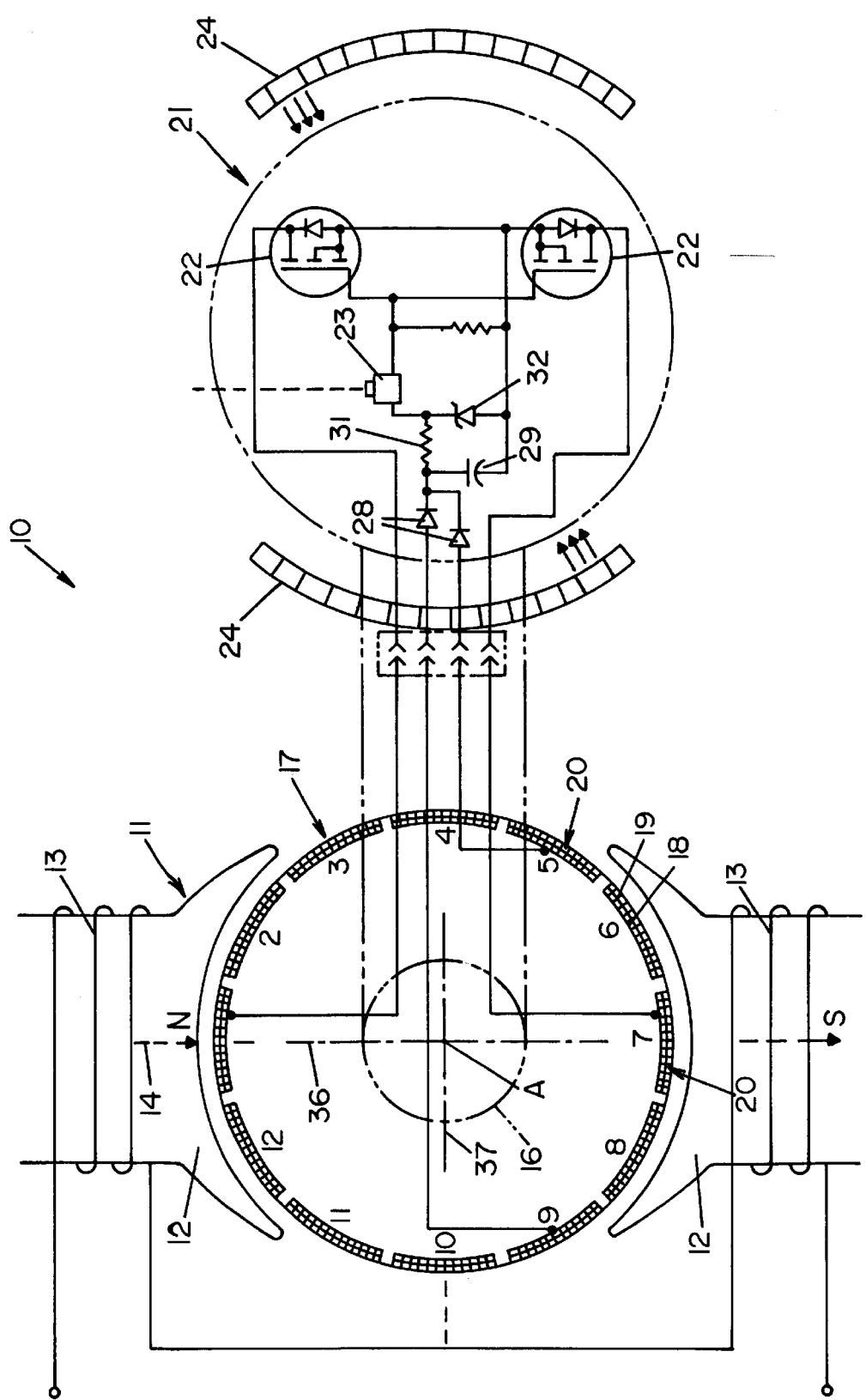
FIG. 2 is a schematic illustration showing the arrangement of the present invention.

Referring now to the drawings, wherein the purpose of illustrating the preferred embodiments of the invention only, and not for the purpose of limiting same, an electric motor 10 constructed in accordance with the invention is illustrated in FIG. 1 and diagrammatically illustrated in FIG. 2. The motor 10 is a single-phase, two-pole brushless repulsion motor comprising a motor stator 11, which in turn includes a pair of diametrically opposed magnetic poles 12. Magnet poles 12 have field windings 13 that are typically connected to a 60 Hz single-phase utility power. Field windings 13 produce a magnetic field that is in a direction indicated by an imaginary line or axis 14 extending from one pole 12 to the other. Stator 11 is constructed in essentially the same manner as a conventional AC brushless repulsion motor.

A rotor or armature 17 of motor 10 is constructed in essentially the same manner as a conventional brushless repulsion motor with the inventive modifications discussed below. Rotor 17 is supported for rotation about a central shaft 16 located about a central axis A. Central shaft 16 is supported for rotation about central axis A by axially spaced bearings 15 mounted on opposite ends of rotor 17. A plurality of axial or longitudinal slots 18 are located on the periphery of rotor 17 and into which are fitted a plurality of generally longitudinal coils 19. Coils 19 have many turns and slots 18 may receive one or more coils 19. The ends of coils 19 are terminated or connected to the electronic switches 21 by coil segments 20. It will be understood that coils 19 can also be terminated in other convenient ways, since the brushless repulsion motor of the present invention eliminates the regular commutating surface of the segments 20. Motor 10 operates generally like known brushless repulsion motors, except that it includes electronic means on shaft 16 outside a motor housing 30 to short the ends of the rotor winding coils 19, which eliminates the need for conventional electric commutators and brushes that do the same.

Coils segments 20 are typically arranged in diametrically opposed pairs. By way of illustration, but not by way of limitation, there are twelve coil segments illustrated in the embodiment of FIG. 2. Associated with each pair of coils 20 is an electronic switch circuit 21, diagrammatically illustrated in FIGS. 1 and 2. Thus, at appropriate times in the rotation of rotor 17, electronic switches 21 will be individually closed or rendered conductive to short and thus electrically connect their respective coils 19 together. It will be appreciated that as with conventional repulsion motors, torque and rotation are developed between rotor 17 and stator 11 with the field windings 13 energized and appropriate coil segments 20 shorted.

Electronic switch circuit 21 comprises a pair of power semiconductors such as MOSFET transistors 22 and a triggering device such as a phototransistor 23. The output terminals of the power transistors 23 are connected individually to the diametrically opposed coil segments 20 numbered, clockwise 1 and 7, while their inputs are connected in common. Phototransistor 23 and power transistors 22 are energized by related electronic circuitry comprising a pair of diodes 28, a capacitor 29, a resistor 31, and a zener diode 32. The inputs of the diodes 28 are connected to segments 20, numbered 5 and 9. Since voltages vary between armature windings during rotation of rotor 17, a voltage (limited by zener diode 32) is developed on capacitor 29 sufficient to operate phototransistor 23 and power transistors 22. When phototransistor 23 is illuminated by a suitable light source 24, phototransistor 23 switches on and in turn, switches on the power transistors 22, placing them in a conductive state.

Electronic switches 21, with their associated circuitry, illustrated in FIG. 2, are replicated for each pair of coil segments 20. For clarity, this replication is not shown. It will be understood that electronic switches 21 are suitably fixed outside motor housing 30 as described hereinafter.

With reference to the embodiment of FIGS. 1 and 2, it will be assumed that the angular extent and relationship with reference to the axis of rotation A of coil segments 20 to armature coils 19 is like that of conventional repulsion or universal series motors. Furthermore, phototransistors 23 each have a window or light receptor, that is centered at a bisector of the arc of an associated coil segment 20 and have a field of view, generally coextensive with the arcuate extent of a typical coil segment 20. Thus, the angular location of each light receiving means for phototransistor 23 is at the same angular center as in associated coil segment 20. It will be appreciated that other control signal receiving arrangements, including prisms or fiber optics for receiving a control signal from a light source 24 can be used. As shown in this embodiment, light source 24 is duplicated at diametrically opposite points transverse to the axis of rotation of rotor 17. Also, other non-contact signaling means such as RF transmitter-receivers or electromagnets may be used instead of light.

Light sources 24 are arranged in an array on the end bell 90 of motor housing 30. The position reference markers or light sources 24 are located so that the light signal or radiation emitted from them shines in a beam that radially intersects the path or orbit of the phototransistors 23.

Reference markers 24 comprise known devices such as light emitting diodes (LED) or an incandescent bulb (or array of incandescent bulbs) powered by the AC line, and any necessary power supply. As shown in FIG. 2, a pair of diametrically opposed position reference markers 24 are energized at approximately the 2 o'clock and 8 o'clock positions. With stator windings 13 and reference marker light source 24 energized, the relevant electronic switch 21, located outside motor housing 30, will cause its associated coil segment 20 to be shorted. For instance, as shown at the instantaneous point of time in FIG. 2, this is segments numbered 3 and 9. As rotor 17 rotates clockwise, segments 2 and 8, 1 and 7, etc. will be shorted. This results in the light or reference marker 24 energizing phototransistor 23 to energize the associated power transistors 22.

It will be appreciated that when a pair of segments 20 in an angular position other than a line with a soft neutral axis 36 corresponding to imaginary line 14 and to the 12 o'clock and 6 o'clock locations or aligned with the hard neutral axis 37 corresponding to the 3 o'clock and 9 o'clock locations are shorted and stator windings 13 are energized with an AC voltage, rotor 17 will develop a torque and will rotate. This is illustrated in FIGS. 1 and 2, where reference marker lights 24 are disposed approximately between the 1 o'clock and 5 o'clock positions and 7 o'clock and 11 o'clock positions. At the energized position as shown by the arrows at the 2 o'clock and 8 o'clock positions, torque and rotation of rotor 17 will be induced in a counterclockwise direction. As the light signal associated with one of electronic circuits 21 moves away from the influence of reference marker light 24, an adjacent electronic circuit moves into such influence and rotor rotation is thereby maintained. It will be appreciated that each separate electronic circuit 21 will be energized for shorting its respective pairs 20 twice each revolution, once at each arrival at the diametrically opposed reference marker light source 24. From the foregoing, it will be understood that there are six electronic circuits 21 which work in combination with reference marker light sources 24 to perform the segment shorting function previously performed by electric brushes and commutator segments in conventional repulsion motors.

Torque and rotation can be changed on motor 10 by energizing a different set of LEDs located in light array 24.

As the angular position of the reference marker lights 24 is moved away from the 2 o'clock and 8 o'clock positions counterclockwise toward soft neutral axis 36, the torque and speed developed by the motor generally decreases. With light 24 very close to soft neutral axis 36, torque decreases and is zero when centered at this location. When lights 24 are energized and moved clockwise from the 2 o'clock and 8 o'clock position paths past the hard neutral axis 37 to the 4 o'clock and 10 o'clock positions, the rotor rotates in the opposite direction, i.e. clockwise with the torque and speed increasing with the angular displacement from neutral axis 37.

Applicant has found that in order to improve the reliability and ease of replacing an electronic component, each of electronic switches 21 have been mounted on central shaft 16 outside motor housing 30 on or within control module 41. A circuit board 42 is mounted to base plate 43 by screws 44. It will be appreciated that circuit board 42 could be directly mounted to shaft 16, thus eliminating base plate 43. A cover housing 45 having a top portion 46 and depending edges 47 extending therefrom can be added, snapping onto the end bell 90 of motor housing 30.

In the preferred embodiment, six separate electronic switches, S1–S6, each corresponding to electronic switch 21 are located on circuit board 42. It will be appreciated that, as shown in FIG. 2, switch S1 is illustrated, while switches S1–S6 are diagrammatically illustrated in FIG. 11. It will be appreciated that moving switches S1–S6 and all other electronic components outside the motor housing 30 reduces their exposure to heat produced by the motor. Additionally, heat sink 51 for each of switches S1–S6 on circuit board 42 further reduces heat from the switches.

A quick connect mechanism 52 is provided between control module 41 and specifically base plate 43, and central shaft 16 of rotor 17 as shown in FIG. 1. The quick connect mechanism includes male and female plug in connectors 53a and 53b, respectively, which are secured by a snap ring 54. It will be appreciated that upon removal of cover housing 45 and snap ring 54, base plate 43 can be removed from central shaft 16 for repair or replacement of any of electronic switches 21.

This significantly improves motor 10 in that it removes the difficulty of repair or replacement of switches 21 from inside the housing of the equipment. Just as important, repair and replacement are needed less frequently, since switches 21 have been removed from the source of the heat inside motor housing 30. It will be appreciated that heat isolation of control module 41 can be augmented with insulating material 101 on the motor end plate and/or ventilation vent 102.

Figure 5:
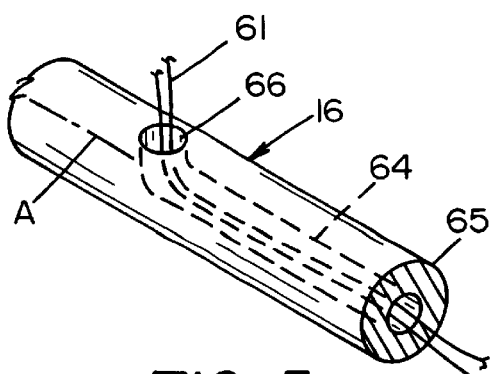
FIG. 5 is a diagram, partially in cross-section, of an embodiment of the rotor of the present invention.
Figure 6:
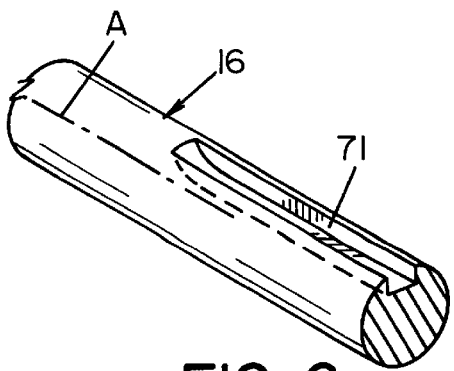
FIG. 6 is a diagram, partially in cross-section, of another alternative embodiment of the rotor of the present invention.
Figure 9:
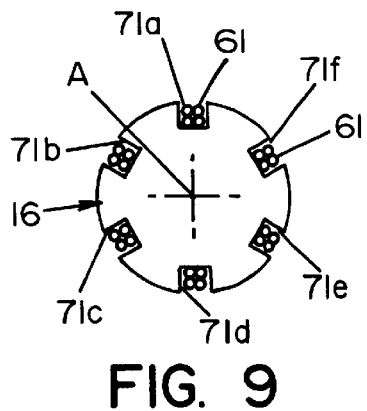
FIG. 9 is an end view of the rotor of the present invention.
Figure 7:
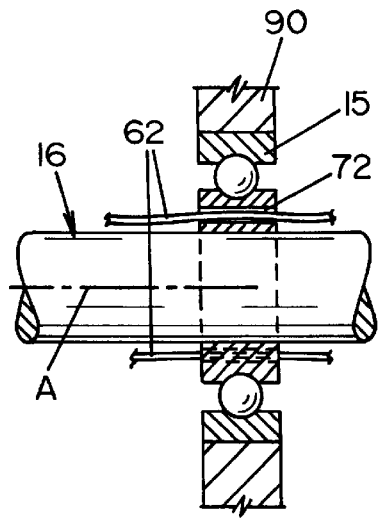
FIG. 7 is a partial cross-sectional view of yet another alternative embodiment of the rotor of the present invention.
Figure 8:
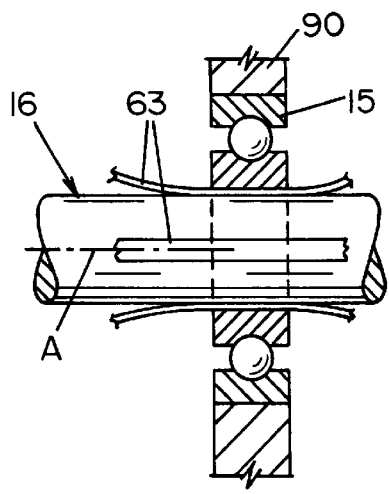
FIG. 8 is a partial cross-sectional view of a still alternative embodiment of a rotor of the present invention.

FIGS. 5–9 show different approaches which can be used to bring the conductors, i.e. wire 61, fiber optic 62, or tape 63, from inside motor housing 30 to outside bearings 15. As seen in FIG. 1 and FIG. 5, the end of central shaft 16 is bored out and has a cylindrical conduit 64 therein, extending from an outside end 65 to an interior 90° elbow section 66. An alternate embodiment is shown in FIG. 6 in which a keyed slot 71 is used to pass wire 61 between the interior of motor housing 30 and the exterior. As shown in FIG. 7, a hole 72 passes through bearing 15 adjacent shaft 16 allowing fiber optic 62, or alternatively, wire 61 to pass therethrough. As shown in FIG. 8, thin strips of conductive material, commonly conductive tape 63 are placed on shaft 16 between it and bearing 15 allowing conduction between the inside and outside of motor housing 30. Finally, as shown in FIG. 9, six grooves 71a–71f are cut within shaft 16, similar to the single groove in FIG. 6. In accordance with the embodiment of the present invention, two sets of wire per keyed slot 71a–71f pass from within motor housing 30 to the exterior of motor housing 30. Since there are twelve coils, there are six slots 71a–71f.

Figure 11:
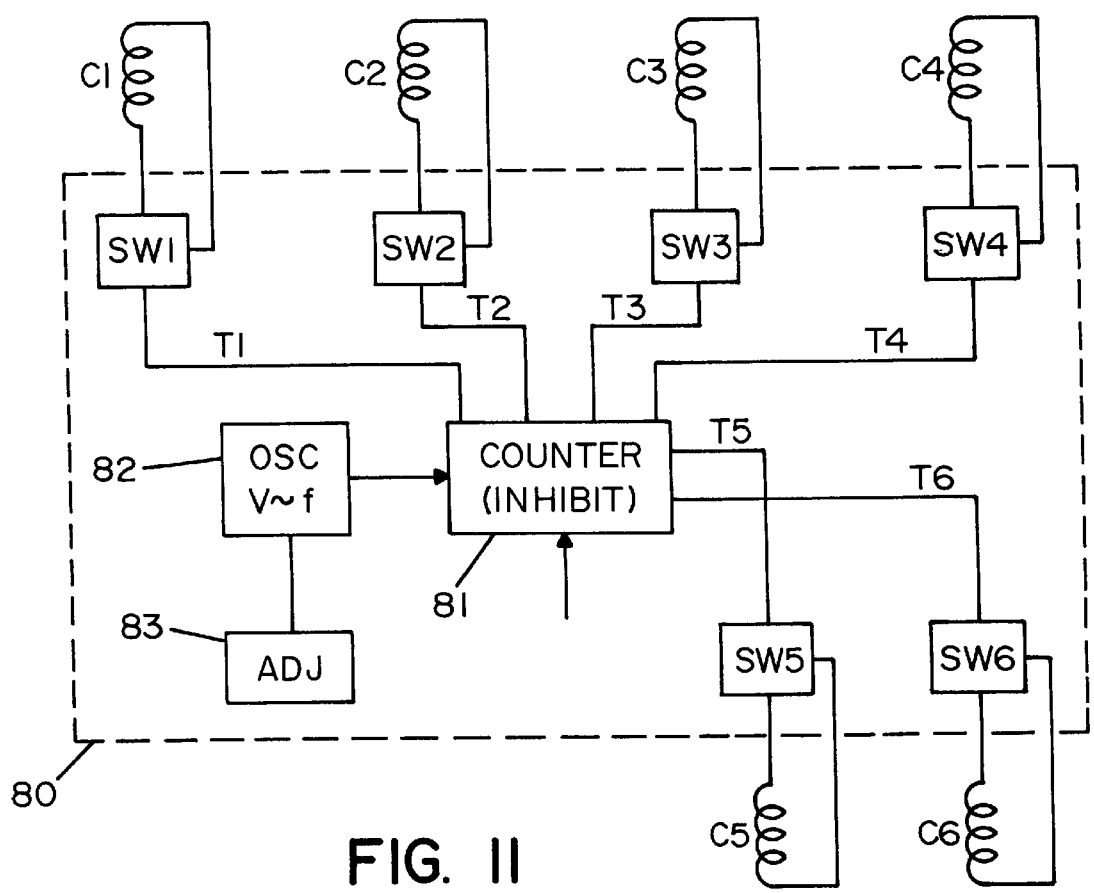

It will be appreciated that the embodiment of FIGS. 1 and 2 may be significantly modified with other control circuitry. For instance, a control system can be utilized whereby the brushless repulsion motor can be directly connected to an AC power source and operated at over a controlled speed range of 0–15,000 rpm. Such a control system 80 is illustrated in FIG. 11.

Therein, it is shown that control system 80 comprises a counter 81 driven by an oscillator 82 having an adjustable output frequency controlled by a rheostat 83. The output of counter 81 is a succession of switch activating signals T1–T6, which are provided in sequence by counter 81 at the rate determined by the frequency of oscillator 82. Thus, the rate of cycling through switch closing signals T1–T6 is a fixed rate determined by the frequency from oscillator 82 as adjusted by rheostat 83. Switch triggering signals in lines T1–T6 close successive switches that short, sequentially, the circumferentially spaced coils C1–C6, as shown in FIG. 11. Previously, such control system 80 was mounted on rotor 17 within housing 30. The present invention allows that the entire control system 80 can be mounted on or within control module 41.

As disclosed in FIGS. 1 and 2, it will be appreciated that an opening 91 is cut within base plate 43 of control module 41 at a radial point from axis A below the location of each phototransistor 23. Alternatively, the plate 43 could be made smaller in diameter to permit light transmission. As discussed above, light source 24 is preferably an LED array arranged at a radial distance from axis A equidistant to that radial distance on which opening 91 lies. Indeed, array 24 lies on a concentric circle from axis A at the equidistant radial distance. As control module 41 rotates with rotor 17 on central shaft 16, light source array 24 actuates each of electronic switches S1–S6. A controller 103 is wired to each of light sources 24 in order that the actual location of light source 24 can be changed from the shown 2 o'clock and 8 o'clock positions to anywhere between 1 o'clock and 5 o'clock locations and 7 o' clock to 11 o' clock locations. The signal is changed simply by deactivating one light on the array 24 and activating a different light on the array in a conventional manner. Light diodes 24 are mounted on end bell 90 by screws 93.

Figure 3:
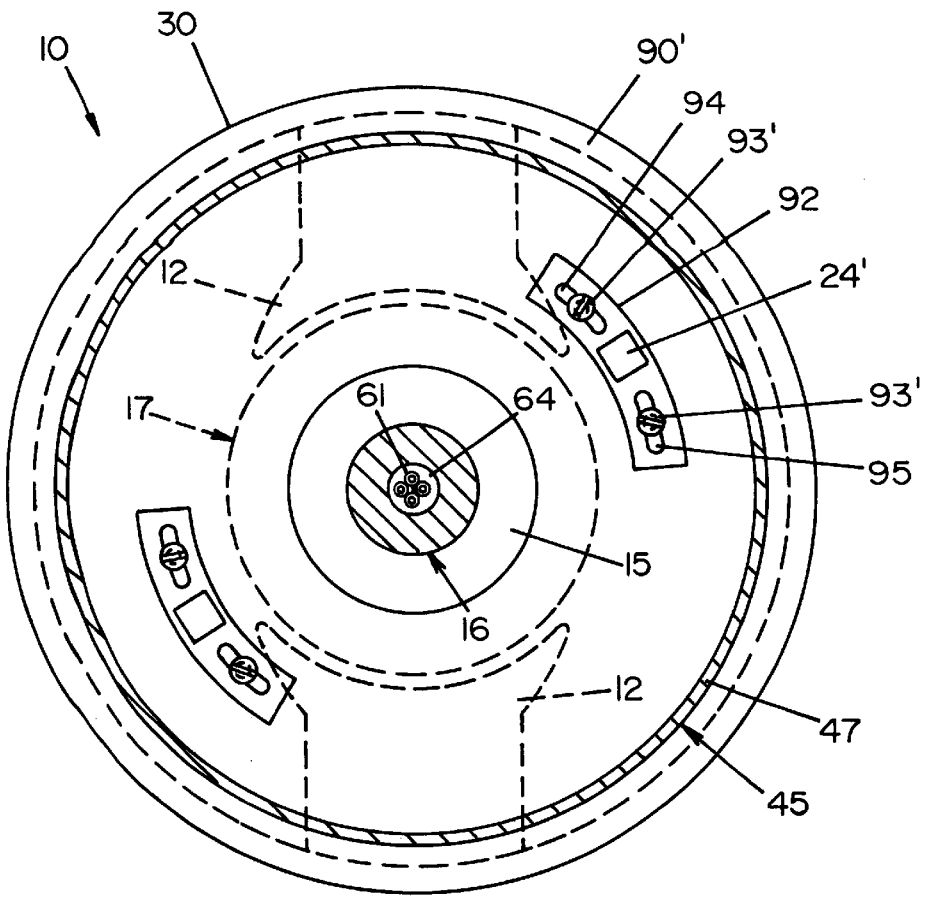
FIG. 3 is a cross-sectional view taken along line 3—3 of FIG. 1.
Figure 4:
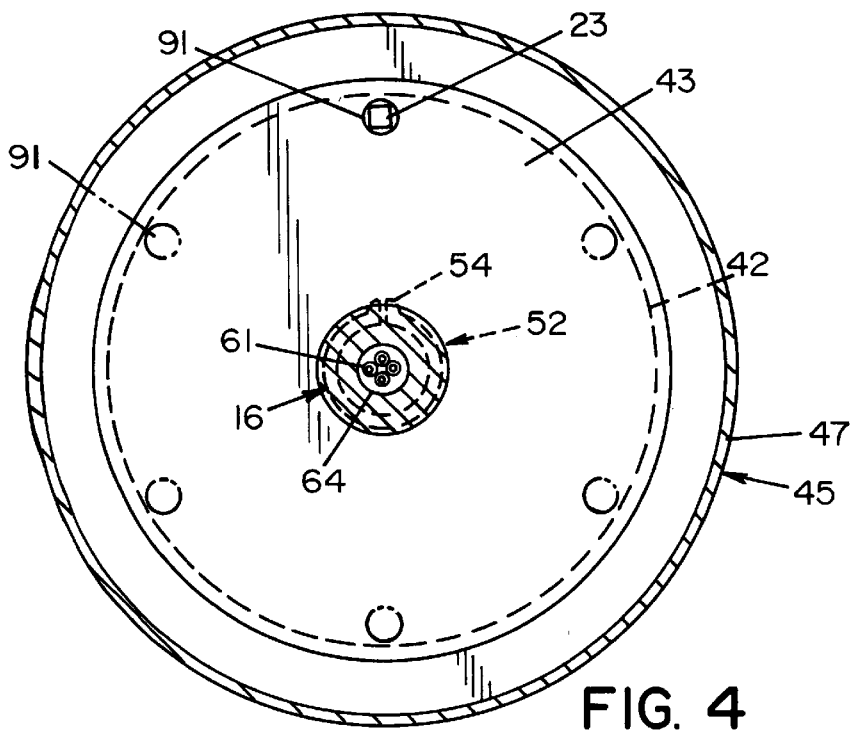
FIG. 4 is a cross-sectional view taken along line 4—4 of FIG. 1.

In an alternative embodiment shown in FIGS. 3 and 4, light diode 24' is mounted as a single light diode mounted on an arcuate slide 92 attached to end bell 90' by screws 93'. Within arcuate slide 92 are slots 94 and 95. In this manner, the location of light diodes 24' can be changed from, as shown, the 2 o'clock and 8 o'clock positions to anywhere along the circumference of the end bell. As described above with respect to FIGS. 1 and 2, the location of light diodes 24' affects the torque and rotation of rotor 17 by energizing each circuit 21 for shorting its respective segment pairs 20. Thus, the torque, rotation and direction of the motor can be changed by manually moving light diodes 24 on the end bell 90, by the LED array disclosed in FIGS. 1 and 2, or by some remotely controlled mechanism. In addition to light, other contactless means may be employed to transmit command signals and feedback information to and from the control module. This includes electromagnets and RF transmitter-receivers.

Figure 10:
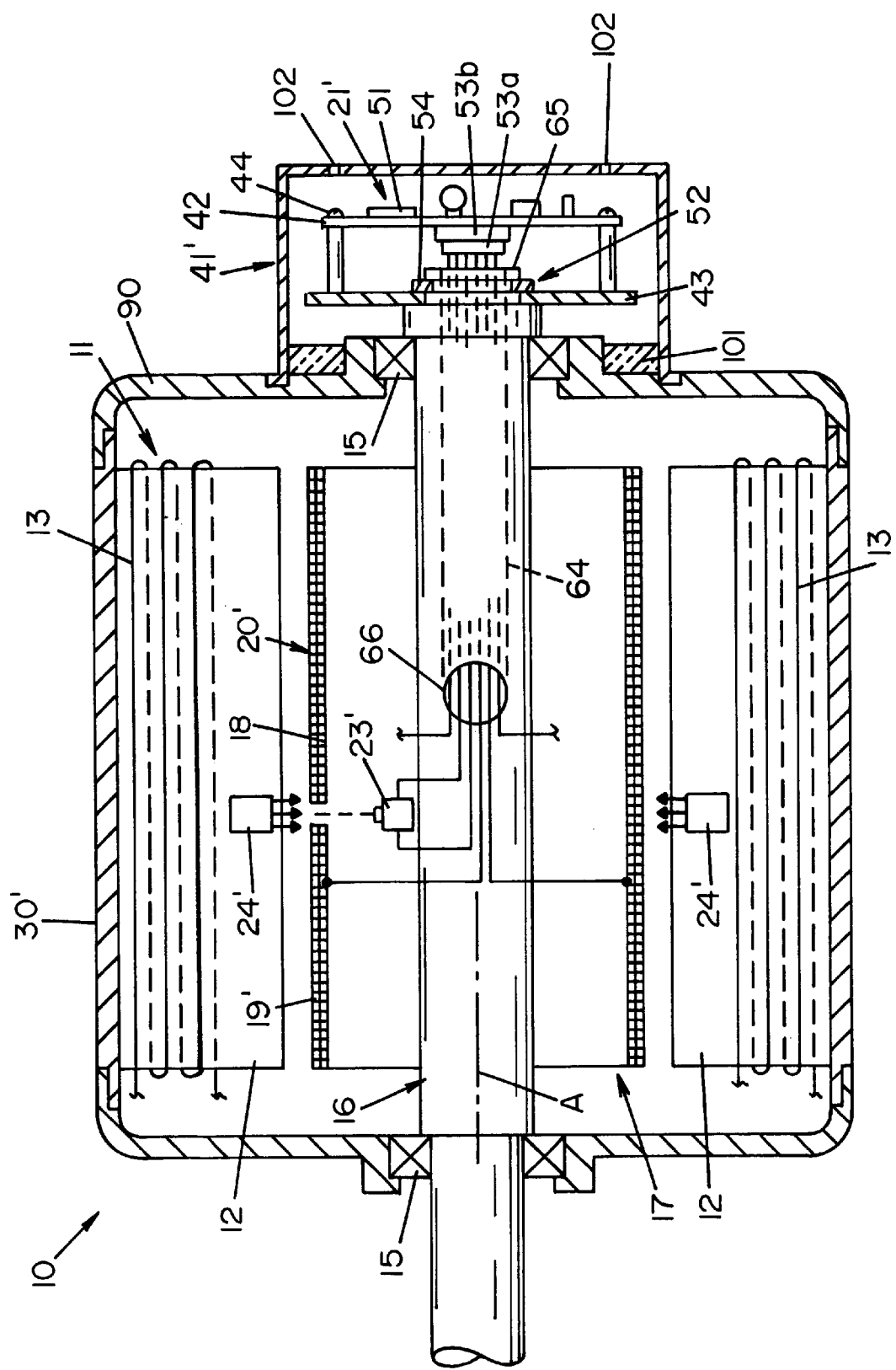
FIG. 10 is a plan view of an alternative embodiment brushless repulsion motor, partially in cross-section, of the present invention; and, FIG. 11 is a diagram showing alternative electronic switching for either the present invention, or the embodiment of FIG. 10.

Referring now to FIG. 10, the electronic circuitry of FIGS. 1 and 2 is shown therein.

However, as shown, coils 19', coil segment 20', and phototransistor 23' remain on rotor 17. Electronic switches 21' are located within control module 41'. It will be appreciated that control module 41' can be smaller than the control module disclosed in FIGS. 1 and 2, since phototransistors 23' remain within motor housing 30'. As shown in FIG. 10, light source 24' is a single light-emitting diode (LED). It will be appreciated that an LED array such as disclosed in FIGS. 1 and 2 may also be substituted. The purpose of FIG. 10 is to illustrate an alternative embodiment of the invention only, and not for the purpose of limiting same.

The invention has been described with specific reference to the preferred embodiments and modifications thereto. Further modifications and alterations may occur to others upon reading and understanding the specification. It is intended to include all such modifications and alterations insofar as they have come within the scope of the invention.

The power switching transistors can be mounted on the circuit board 42 (which can be shaped as a control disc), such that they are upright. In this position, the body of each power transistor switch acts as a vane or fin of a fan blade. The power transistors are equally spaced around the control disc, and when the armature rotates, the transistors will, by fan action, remove heat from the power switches, and also blow air out of control module 41 over the motor for cooling purposes. Normally, a totally enclosed motor has an external fan mounted on the rear shaft. The invention allows that the power transistors can provide this function.

Having thus described the invention, it is claimed:

1. A brushless repulsion motor comprising a stator and a rotor rotatably mounted on said stator for rotation about an axis, said stator and rotor contained within a first housing, said stator having at least one pair of poles, a field winding on said stator for producing a field in said stator, a plurality of coils on said rotor adapted to electromagnetically interact with the field of the stator winding, switching means located outside said first housing to selectively short successive ones of said coils when said coils are in an angular position relative to said stator poles where the stator field is effective to induce a current in said coils and produce a resultant relative rotation between the rotor and stator.

2. The brushless repulsion motor of claim 1, wherein said switching means is located on the rotor shaft.

3. The brushless repulsion motor of claim 1, wherein said switching means is located within a second housing.

4. The brushless repulsion motor of claim 1, wherein said second housing is fixed on said first housing.

5. The brushless repulsion motor of claim 1, including mutually non-contacting signaling means to vary the effective angular position to vary the direction, torque, acceleration, and/or speed developed on said rotor.

6. The brushless repulsion motor of claim 5, said mutually non-contacting signaling means comprising a signal source and signal receiving means to vary the direction, torque, acceleration and/or speed developed on said rotor.

7. The brushless repulsion motor of claim 6, wherein said switching means and said signaling means is located within a second housing.

8. The brushless repulsion motor of claim 7, wherein said switching means has heat sink means located adjacent thereto.

9. The brushless repulsion motor of claim 8, wherein said signal source is a light emitting diode.

10. The brushless repulsion motor of claim 1, including quick connect means for engaging and disengaging said switching means from said rotor.

11. The brushless repulsion motor of claim 10, wherein said quick connect means includes a snap ring which interengages with at least one male connector and at least one female connector.

12. The brushless repulsion motor of claim 1, wherein said motor includes mutually non-contacting signaling means comprising a signal source and signal receiving means for placing said switching means in a conductor state, said signal receiving means being located within a second housing.

13. The brushless repulsion motor of claim 12, wherein said signal source is located on said first housing.

14. The brushless repulsion motor of claim 13, wherein said signal source includes means for adjusting the position of said signal source.

15. The brushless repulsion motor of claim 14, wherein said means for adjusting the position includes a light emitting diode array attached to an end bell of said first housing.

16. The brushless repulsion motor of claim 12, wherein said signal source includes at least one light emitting diode.

17. The brushless repulsion motor of claim 16, wherein said signal source includes at least two light emitting diodes located diametrically opposed on said end bell of said first housing.

18. A brushless repulsion motor comprising a stator and a rotor rotatably mounted on said stator for rotation about an axis, said stator and rotor contained within a first housing, said stator having at least one pair of poles, a field winding on said stator for producing a field in said stator, a plurality of coils on said rotor adapted to electromagnetically interact with the field of the stator winding, switching means on a circuit board and signaling means for placing said switching means in a conductive state are located within a second housing to selectively short successive ones of said coils when said coils are in an angular position relative to said stator poles where the stator field is effective to induce a current in said coils and produce a resultant relative rotation between the rotor and stator.

19. The brushless repulsion motor of claim 18, including quick connect means for engaging and disengaging said circuit board from said rotor.

20. The brushless repulsion motor of claim 19, wherein said quick connect means includes a snap ring which interengages with a first connector and a second connector, said first connector attached to said circuit board, said second connector attached to said rotor.

21. A brushless repulsion motor comprising a stator and a rotor rotatably mounted on said stator for rotation about an axis, said stator and rotor contained within a first housing, said stator having at least one pair of poles, a field winding on said stator for producing a field in said stator, a plurality of coils on said rotor adapted to electromagnetically interact with the field of the stator winding, electronic switches located outside said first housing to selectively short successive ones of said coils when said coils are in an angular position relative to said stator poles where the stator field is effective to induce a current in said coils and produce a resultant relative rotation between the rotor and stator, said electronic switches arranged in an array to act as vanes of blades thereby cooling said motor.

* * * * *